United States Patent [19]
Da Ré: Mario et al.

[11] Patent Number: 5,455,090
[45] Date of Patent: Oct. 3, 1995

[54] TUBULAR COMPONENT MADE OF COMPOSITE MATERIAL, AND A DEVICE AND METHOD FOR PRODUCING IT

[75] Inventors: Da Ré: Mario; Paolo G. Guidoboni, both of Turin, Italy

[73] Assignee: Fiat Auto S.p.A., Turin, Italy

[21] Appl. No.: 101,935

[22] Filed: Aug. 4, 1993

[30] Foreign Application Priority Data

Aug. 4, 1993 [IT] Italy ................................. T092A0678

[51] Int. Cl.$^6$ ............................. B29D 23/00; B29C 70/06
[52] U.S. Cl. ......................... 428/36.1; 428/36.5; 428/902; 264/129; 264/136; 264/137; 425/110; 425/111
[58] Field of Search .................... 428/36.1, 902, 428/36.5; 264/129, 136, 137; 425/110, 111

[56] References Cited

U.S. PATENT DOCUMENTS 4,511,523  4/1985  Hsu .

FOREIGN PATENT DOCUMENTS

| 664935 | 10/1965 | Belgium . |
| 2376984 | 10/1978 | France . |
| 2137059 | 7/1972 | Germany . |
| 2065706 | 6/1975 | Germany . |

OTHER PUBLICATIONS

European Search Report (EP 93 11 2243) 3 Nov. 1993.

Primary Examiner—James J. Bell
Attorney, Agent, or Firm—Knobbe, Martens, Olson & Bear

[57] ABSTRACT

A tubular component made of composite material comprises a core of resistant fibers impregnated with a matrix of thermohardening resin. The core includes a tubular reinforcement made of fabric or of non-woven fabric. The tubular reinforcement comprises at least two coaxial adjacent layers which have reciprocal connection elements projecting radially.

35 Claims, 2 Drawing Sheets

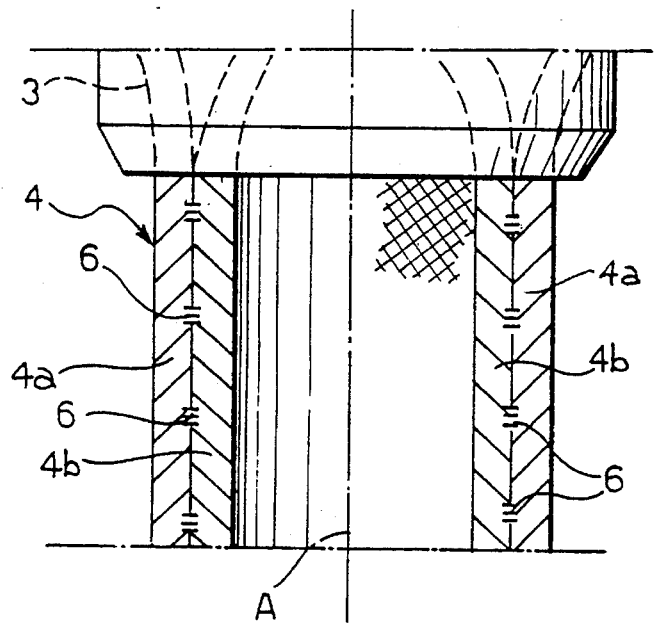
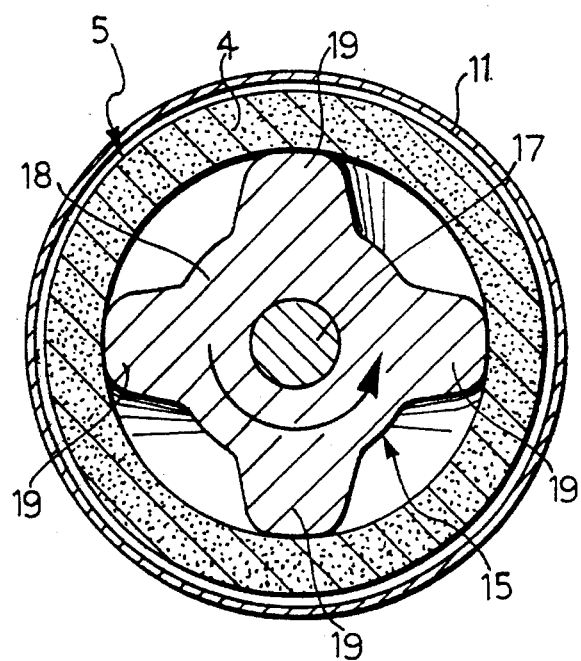
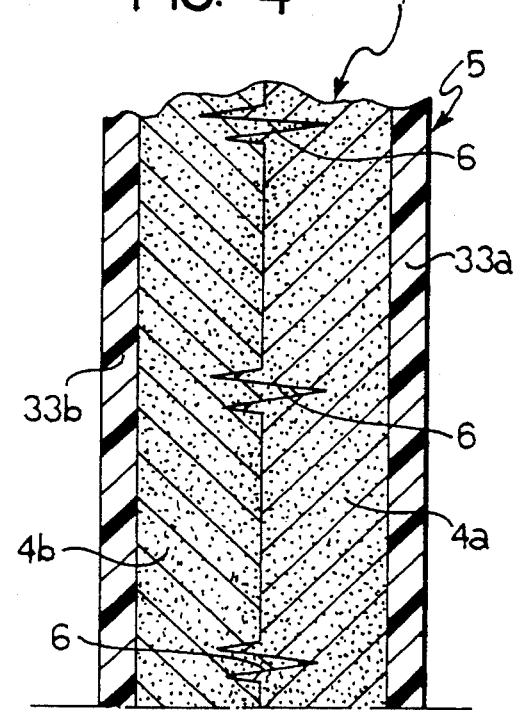

TUBULAR COMPONENT MADE OF COMPOSITE MATERIAL, AND A DEVICE AND METHOD FOR PRODUCING IT

DESCRIPTION

The present invention relates to structures made of composite material using a matrix of thermohardening resin, which structures can be used as structural reinforcement components in various fields of technology.

In particular the invention relates to a tubular component of the type defined in the pre-characterising part of claim 1.

The object of the present invention is to provide a tubular component made of composite material of a type which is an improvement compared with known types, is easy to handle and store and can be easily shaped in its non-polymerised state, and is highly resistant in its polymerised state.

This object is achieved by means of the features indicated in the characterising part of claim 1.

The tubular component according to the present invention has high-performance mechanical properties making it suitable for replacing structural components which hitherto were made of metal components, thus permitting the weight of these parts to be considerably reduced. In particular this component may advantageously be used in order to produce structural components of various types, and in particular the bodywork of motor vehicles, such as for example cross-members under the dashboard, frameworks of movable parts such as doors and hatches, rollbars, or frames for supporting the power unit.

The object of the invention is also a device for producing a tubular component made of composite material.

The device is characterised in that it comprises in succession:

a container of thermohardening resin disposed in such a manner that it surrounds a tubular reinforcement core made of fabric or non-woven fabric, whereby as the tubular reinforcement core passes through said container, it is impregnated with the resin present therein; and a compressor member adapted to subject the tubular reinforcement core impregnated with resin to a radial compression action, such a compression action being directed from the inside towards the outside of the tubular reinforcement core.

The object of the invention is also a method of producing a tubular component made of composite material.

This method is characterised in that it comprises the following operations:

providing a tubular reinforcement core made of fabric or non-woven fabric consisting of resistant fibres;

impregnating the reinforcement ore with a thermohardening resin; and subjecting the impregnated reinforcement core to a radial compression action by means of a compressor member disposed inside the reinforcement core, whereby the reinforcement core is subjected to a compression action directed from the inside towards the outside.

Further features and advantages of the present invention will become apparent from the following detailed description, given with reference to the attached drawings, provided purely as a non-limiting example, in which:

BRIEF DESCRIPTION OF THE DRAWINGS

FIG. 2 is a transverse cross-section elevation view of a detail of FIG. 2, designated by the arrows II—II;

FIG. 3 is a lateral cross-section elevation view of a detail of reinforcement core of a tubular component according to the present invention; and FIG. 4 is a view similar to FIG. 3 of a detail of FIG. 1 designated by the arrow IV.

Figure 1:
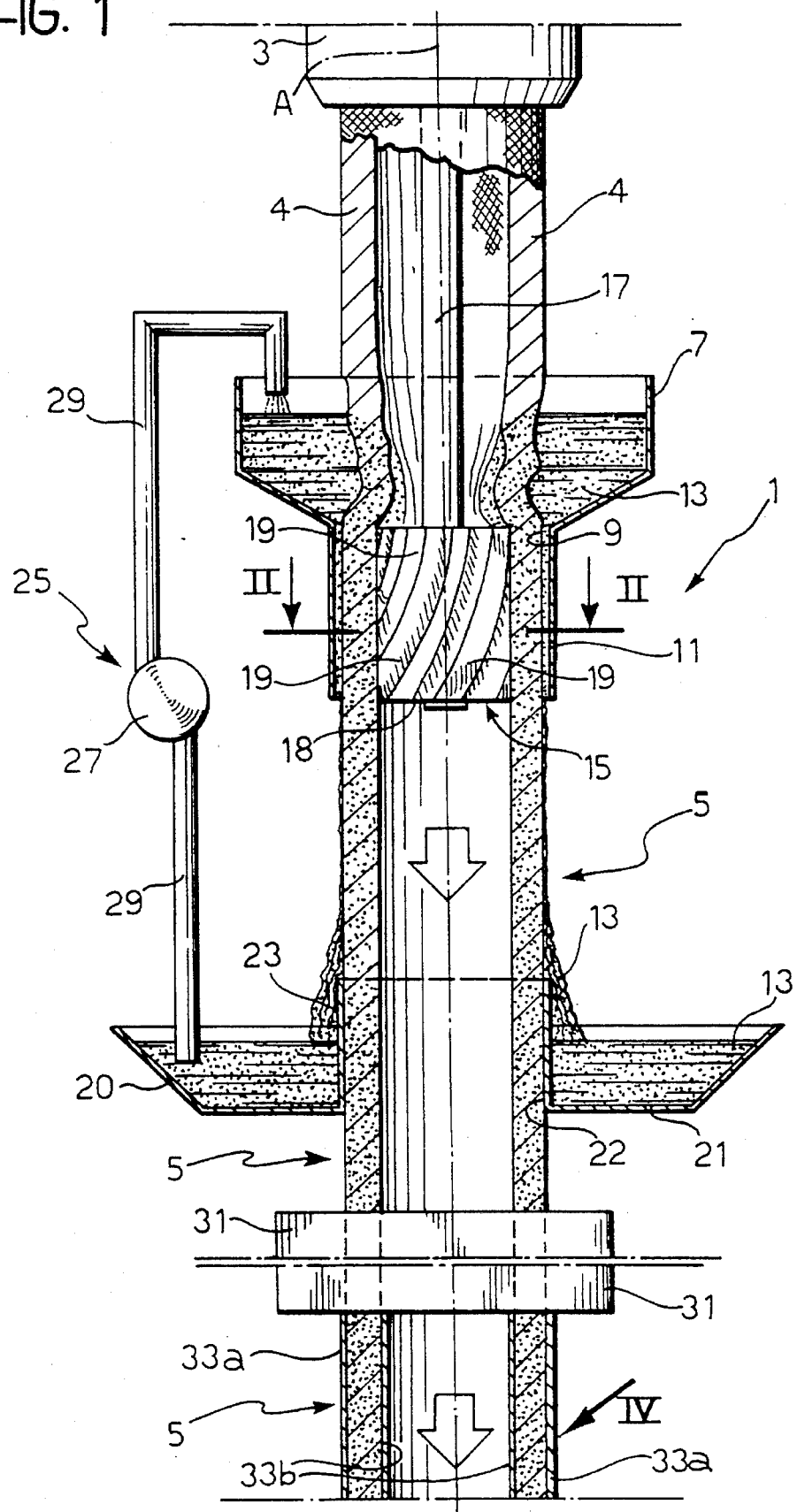
FIG. 1 is a partial lateral cross-section elevation view showing schematically a device for producing a tubular component made of composite material according to the present invention.

With reference initially to FIG. 1, a device for producing a tubular component made of composite material is designated 1 as a whole.

The device 1 comprises a dispenser unit 3 which can produce continuously a tubular reinforcement core 4 made of fabric or of non-woven fabric substantially in a "sock" form, by processing resistant filaments or fibres. This dispenser unit is of a known type and will therefore not be described in greater detail since it does not come within the scope of the present invention.

The unit 3 can be supplied with fibres of various types, depending on the type of reinforcement core to be obtained, such as mineral fibres (for example glass fibres or aramide fibres), or organic fibres (for example carbon fibres or plant fibres), or metal fibres or thermoplastics fibres.

Below the unit 3 along the axis A of the core 4 produced by the unit 3, there is disposed a container 7 provided with a central hole 9 inside which the core 4 is disposed. The container 7, which is substantially in the form of a tray surrounding the core 4, has a cylindrical wall 11 which projects from the central hole 9 on the side opposite the unit 3, coaxially with the outer surface of the core 4. The container 7 is filled with a thermohardening resin 13 which may for example be of the type such as unsaturated polyester, or vinyl ester, or polyester-polyurethane, or phenolic polyester or epoxy polyester, in the fluid, non-polymerised state.

As the tubular core 4 passes through the central hole 9 of the container 7, the core 4 is impregnated with the resin 13 which penetrates its fibres by force of gravity and thus produces a tubular component 5 made of composite material. At the part of the container 7 provided with the cylindrical wall 11, inside the tubular core 4 there is inserted a rotary member 15 which is rotatably supported by a drive shaft 17 which is disposed coaxially with the axis A of the unit 3. As can be seen in greater detail in FIG. 2, the member 15 comprises a plurality of ribs 19 (four in the example illustrated) which project radially outside a substantially cylindrical core 18 rigidly connected to the drive shaft 17. The ribs 19 are wound helically about the core 18, and when the member 15 is rotated by the shaft 17, the movement of the ribs provides a compression force directed from the inside towards the outside of the tubular component 5. This compression action enables optimum distribution amongst the fibres which constitute the core 4 to be obtained from the resin matrix 13. This rotary member 15 also compacts radially the tubular component cross-sections which come into contact therewith. The rotary member 15 cooperates with the cylindrical wall 11 so as to define the cylindrical form of the tubular component 5 made of composite material.

Between the wall 11 and the outer surface of the tubular component 5, there is a radial gap by means of which the resin 13 left over from impregnating the fibres of the core 4 is disposed on the outer surface of the tubular component 5.

Downstream of the container 7 there is disposed a tank 20, also in the form of a tray, the bottom 21 of which is provided with a circular aperture 22 through which the tubular component 5 can pass. From the aperture 22 in the bottom 21 there projects in the direction of the container 7 an annular wall 23 which acts as a scraper for the excess resin 13, which by this means is deposited in the tank 20, and which by means of a recirculation plant 25 comprising a pump 27 and pipes 29, is fed back to the container 7. The wall 23 also acts as a final shaping component for the outer wall of the tubular component 5.

Below the tank 20 and in the axial direction A of the tubular component 5, there is a device 31 of a known type which forms coating films 33a, 33b of plastics material, on the outer surface and on the inner surface of the tubular component 5 respectively.

The films 33a and 33b enable the component 5 to be handled when it has not yet been subjected to polymerisation, and prevent the inner walls thereof from sticking together. Additionally, when the component 5 has been subjected to a polymerisation process in order to obtain a rigid structural component, if this component is subjected to impacts which fracture it, the films 33a and 33b enable the parts separated by the fracture to be held together.

After the step in which the films 33a and 33b are formed, the tubular component 5 comprises a semifinished product which can easily be handled and for example stored by being wound onto bobbins or placed in appropriate containers.

According to a preferred embodiment of the invention, and as shown better in FIG. 3 and 4, the unit 3 produces the tubular reinforcement core 4 comprising a plurality of coaxial cylindrical layers 4a, 4b adjacent one another and joined to one another by connection elements 6. The elements 6 are at a predetermined distance from one another in the axial direction A of the tubular reinforcement 4, and comprise sections of the layers 4a, 4b which project radially towards the adjacent layers. These connection sections enable limited sliding to take place between the coaxial adjacent layers 4a and 4b, thus ensuring that the tubular component 5 can easily be shaped, and can thus adapt to twisting paths which have a relatively small radius of curvature. Naturally it will be appreciated that there may be any number of adjacent coaxial layers, and in particular more than two. If the pitch, in other words the axial distance between the connection elements 6, is varied, the required level of sliding can be obtained between the various layers which constitute the reinforcement core 4.

The coaxial layers made of fabric or of non-woven fabric may all comprise fibres of the same type, for example all mineral fibres or organic fibres or metal fibres, or each layer may comprise fibres of a type different from that of the adjacent layers. For example using fibres which have a higher mechanical resistance for the outermost layers, for example metal filaments, tubular components which have greater resistance to perforation from the outside can be produced.

The semifinished product comprising the tubular component 5 can easily be subdivided into sections, each of which may form a finished product which acts as a structural component of the required type. For this purpose a section of tubular component 5 is disposed inside a hollow mould which delimits the outer shape to be assumed by the finished product when processing thereof is completed. The shape of this hollow mould may also be provided with projecting or recessed components, and it may have any transverse cross-section, for example it may be substantially in parallelepipedal shape.

At the ends of the section of the semifinished product consisting of the tubular component 5 there are disposed heads (not shown in the Figures), each of which is provided with a two-way valve, of which the opening and closing in both directions can be controlled externally, for example by means of an electrical signal. A pressurised fluid, for example air, water or steam, is supplied by means of the heads, through these valves, to the inside of the component 5, such that the pressure prevailing in the inner recess of the tubular component 5 compresses the latter against the walls of the hollow mould. In this case the inner coating film 33b prevents the pressurised fluid from passing through the wall of the tubular component 5 and thus forming a sealing barrier.

The pressurised fluid is heated to a temperature preferably of between 130° and 180° C. and the mould is maintained at the same temperature of the fluid in order to enable polymerisation of the resin to take place. Both the two-way valves are closed in order to prevent pressurised fluid from escaping from inside the tubular component 5. The component 5 is then maintained in this condition for a predetermined length of time until the polymerisation occurs.

Alternatively, the interior of the tubular component 5 can be supplied with a foam fluid, such as for example polyutherane and preferably an expanding resin, which during expansion undergoes an exothermic reaction so as to generate heat, which enables the resin 13 to be polymerised. In this case the foam, which sets when polymerisation of the resin 13 is completed, remains inside the tubular component 5, thus contributing towards the structural resistance of the component 5 and at the same time constituting a sound-absorbing space.

The film of plastics material 33a for coating the outer surface of the tubular component 5 is selected such that it is compatible with and facilitates the processing to which the finished product formed by the tubular component 5 is subjected. In particular, in cases in which the outer surface of the product is to be connected to other structural components, for example by means of gluing, the film 33a will be produced from a plastic material compatible with the adhesives used, and which can facilitate the gluing process and prevent long-term deterioration of the adhesion.

If the reinforcement core 4 comprises a plurality of coaxial layers joined to one another, even after the resin 13 has been polymerised, the possibility of the layers which constitute the reinforcement core being able to slide relative to one another will be limited, so as to enable the resistance features of the product following to impacts to be improved.

What is claimed is:

1. A tubular component made of composite material and comprising a core of fibres impregnated with a matrix of thermohardening resin, wherein the core includes a tubular reinforcement made of fabric or of non-woven fabric, said component comprising at least two coaxial adjacent layers said layers being impregnated with the same resin and having reciprocal connection elements spaced between each other at a predetermined pitch in the axial direction of the tubular reinforcement core, and separated by sliding zones of the coaxial adjacent layers, said sliding zones lacking connection members.

2. A tubular component according to claim 1, wherein said reciprocal connection elements consist of sections of said layers which projet radially towards the adjacent layers.

3. A tubular component according to claim 1, wherein said layers each comprise fibres of the same type.

4. A tubular component according to claim 1, wherein said layers each comprise fibres of a type different from those of the adjacent layers.

5. A tubular component according to claim 1, wherein said component is provided with a coating formed by means of a film of plastics material disposed both on its outer surface and on its inner surface.

6. A tubular component according to claim 1, wherein on the inside said component contains a polyurethane-type foam.

7. A device for producing a tubular component made of composite material, wherein said component comprises in succession:

a container of thermohardening resin disposed in such a manner that it surrounds a tubular reinforcement core made of fabric or non-woven fabric, whereby as the tubular reinforcement core passes through said container it is impregnated with the resin by a radial compressor member comprising a rotary body about the axis of the tubular core, this rotary body being provided with ribs which project externally therefrom adapted to subject the tubular reinforcement core impregnated with resin to a radial compression action, such a compression action being directed from the inside towards the outside of the tubular reinforcement core.

8. A device according to claim 7, wherein said device also comprises a dispenser unit adapted to produce the tubular reinforcement core continuously, the dispenser unit being arranged upstream of said container.

9. A device according to claim 7, wherein said device also comprises a device which forms a coating film of plastics material both on the outer surface and on the inner surface of the tubular component.

10. A device according to claim 7, wherein the container has a cylindrical wall which surrounds the tubular component and which cooperates with the compressor member in order to define the shape of the tubular component.

11. A device according to claim 8, wherein said dispenser unit is able to produce a tubular reinforcement core comprising at least two adjacent coaxial layers provided with reciprocal connection elements.

12. A device according to claim 11, wherein said reciprocal connection elements consist of sections of said layers which project radially towards the adjacent layers.

13. A device according to claim 12, wherein said reciprocal connection elements are spaced between each other at a predetermined pitch in the axial direction of the tubular reinforcement core.

14. A device according to claim 12, wherein said layers each comprise fibres of the same type.

15. A device according to claim 12, wherein said layers each comprise fibres of a type different from those of the adjacent fibres.

16. A device according to claim 7, wherein said ribs are wound helically about the rotary body.

17. A device according to claim 16, wherein said ribs are wound about the rotary body according to at least a triple-helicoidal-start.

18. A device according to claim 16, wherein said rotary body is supported and rotated by a drive shaft which projects from the dispenser unit inside the tubular reinforcement core.

19. A device according to claim 7, wherein downstream of the compressor member there is a tank for collecting the excess resin from the outer surface of the tubular component.

20. A device according to claim 19, wherein said tank surrounds the tubular component and comprises an annular wall which projects from the bottom of the tank towards the container of the thermohardening resin, this annular wall acting as a scraper and as a forming component for the outer surface of the tubular component.

21. A device according to claim 19, wherein a plant for recirculating the excess resin is associated with the container for the resin and with the tank.

22. A method for producing a tubular component made of composite material, wherein said method comprises the following operations:

providing a tubular reinforcement core made of fabric or non-woven fabric consisting of fibres;

impregnating the reinforcement core with a thermohardening resin; and subjecting the impregnated reinforcement core to a radial compression action by means of a compressor member comprising a rotary body disposed inside the reinforcement core and provided with ribs which project externally therefrom, whereby the reinforcement core is subjected to a compression action directed from the inside towards the outside.

23. A method according to claim 22, wherein the tubular reinforcement core is generated continuously by a dispenser unit.

24. A method according to claim 22, wherein it also comprises an operation of coating the inner and outer surfaces of the tubular component by means of respective films of plastics material.

25. A method according to claim 22, wherein the tubular reinforcement core comprises at least two adjacent coaxial layers provided with reciprocal connection elements.

26. A method according to claim 25, wherein said reciprocal connection elements consist of sections of said layers which project radially towards the adjacent layers.

27. A method according to claim 25, wherein said reciprocal connection elements are spaced between each other at a predetermined pitch in the axial direction of the tubular reinforcement core.

28. A method according to claim 25, wherein said layers each comprise fibres of the same type.

29. A method according to claim 25, wherein said layers each comprise fibres of a type different from those of the adjacent layers.

30. A method according to claim 22, wherein said ribs are wound helically about said rotary body.

31. A method according to claim 22, wherein said method also comprises the steps of:

disposing a section of the tubular component obtained in a hollow mould;

subjecting the tubular component to internal pressure by means of a heating fluid at a predetermined temperature;

heating the hollow mould to a predetermined temperature; and maintaining the tubular component in this condition for a predetermined length of time until the resin polymerises.

32. A method according to claim 31, wherein heads are associated respectively with each of the ends of said section of the tubular component, at least one of these heads being provided with a two-way valve controllable externally.

33. A method according to claim 32, wherein the heating fluid is a heating fluid intended to be introduced into the tubular component by means of said two-way valve and to be removed through said two-way valve on completion of the polymerisation step of the tubular component.

34. A method according to claim 31, wherein said fluid is a foam which undergoes an exothermic reaction during its expansion, and that this foam is subjected to hardening inside the tubular component.

35. A method according to claim 34, wherein this foam is a polyurethane type foam.

* * * * *